United States Patent [19]

Ozaki et al.

[11] Patent Number: 5,300,239

[45] Date of Patent: Apr. 5, 1994

[54] WATER-REPELLENT AND OIL-REPELLENT TREATMENT

[75] Inventors: Masaru Ozaki; Isao Ona, both of Chiba, Japan

[73] Assignee: Dow Corning Toray Silicone Co., Ltd., Tokyo, Japan

[21] Appl. No.: 29,646

[22] Filed: Mar. 11, 1993

Related U.S. Application Data

[63] Continuation-in-part of Ser. No. 749,011, Aug. 23, 1991, abandoned.

[30] Foreign Application Priority Data

Aug. 24, 1990 [JP] Japan .................................. 2-223548

[51] Int. Cl.$^5$ .................... D06M 10/08; C08G 77/06; C08G 77/12; C08G 77/20
[52] U.S. Cl. ...................................... 252/86; 252/8.9; 8/115.56; 8/115.64; 8/116.1; 8/128.3; 8/127.5; 528/15; 528/42; 556/439
[58] Field of Search ................. 252/8.6, 8.9; 8/115.56, 8/115.64, 116.1, 128.3, 127.5; 528/15; 556/439

[56] References Cited

U.S. PATENT DOCUMENTS

| | | | |
|---|---|---|---|
| 3,655,420 | 4/1972 | Tichenor | 117/138.8 A |
| 3,903,123 | 9/1975 | Deiner | 260/448.2 |
| 4,624,676 | 11/1986 | White | 8/115.56 |
| 4,685,930 | 8/1987 | Kasprzak | 8/139.1 |
| 4,908,140 | 3/1990 | Bausch | 252/8.6 |
| 4,980,440 | 12/1990 | Kendziorski | 528/15 |
| 5,064,544 | 11/1991 | Lin | 252/88 |
| 5,232,611 | 8/1993 | Ohashi et al. | 252/8.6 |

*Primary Examiner*—Linda Skaling
*Assistant Examiner*—Michael P. Tierney
*Attorney, Agent, or Firm*—Robert L. McKellar; Richard I. Gearhart

[57] ABSTRACT

A treatment agent in which a base component and a crosslinking component contain silicon-bonded perfluoroalkyl groups and curing groups. The components are mutually soluble to homogeneity as a consequence, and this makes possible long-term storage of the mixture of the two components. Moreover, when this treatment agent is used on fibers, textiles, plastics, metals, or porous inorganics and cured, an excellent water repellency and oil repellency are generated because a uniform film is developed.

8 Claims, No Drawings

WATER-REPELLENT AND OIL-REPELLENT TREATMENT

This is a continuation-in-part of copending application Ser. No. 07/749,011 filed on Aug. 23, 1991 now abandoned.

BACKGROUND OF THE INVENTION

The present invention relates to a water-repellent and oil-repellent treatment agent. In more particular terms, the present invention relates to a treatment agent which, by virtue of an excellent compatibility among its components, can impart an excellent water repellency and oil repellency to such materials as fibers, textiles, plastics, metals, porous inorganics, and so forth.

Water repellency can be imparted to fibers, textiles, etc., by treatment with methylhydrogenpolysiloxane or dimethylpolysiloxane; however, the oil repellency remains poor in such cases. As a consequence, it has been recommended that organopolysiloxane be used in combination with a perfluoroalkyl-containing compound.

For example, Japanese Patent Application Laid Open (Kokai or Unexamined) Number 53-81799 (81,799/78) proposes the treatment of textiles using the mixture of dimethylpolysiloxane and/or methylhydrogenpolysiloxane with a fluoroalkyl-containing water-and-oil repellent. However, because these two components are incompatible and cannot be homogeneously interdispersed by dissolution, the durability of the effects of the treatment is poor. Otherwise, Japanese Patent Publication Number 58-1232 (1,232/83) and Japanese Patent Publication Number 59-47071 (47,071/84) disclose the combined use of a fluoroalkyl-containing compound and a reactive group-containing organopolysiloxane (reactive group=epoxy, amino, hydroxyl, carboxyl, etc.). Nevertheless, the same problem as before again arises in this case due to the same absence of compatibility between the fluoroalkyl-containing compound and organopolysiloxane as encountered for Japanese Patent Application Laid Open Number 53-81799. Japanese Patent Publication Number 60-29778 (29,778/85), which has an inventor in common with the present invention, discloses a fiber or textile treatment agent with the following composition:

(1) organopolysiloxane whose molecule contains the fluorocarbon group and at least 3 silicon-bonded hydrogen atoms, and
(2) condensation catalyst; or
(1) organopolysiloxane whose molecule contains
 (a) silicon-bonded hydroxyl at the molecular chain terminals and
 (b) the fluorocarbon group,
(2) organohydrogenpolysiloxane, and
(3) condensation catalyst.

Or course, the problem of compatibility is moot in the case of the first composition. However, in the case of the second composition, while components (1) and (2) are similar organopolysiloxanes, component (1) does contain the fluorocarbon group while component (2) lacks the fluorocarbon group, and their compatibility is poor as a consequence. Thus, for example, separation into two layers occurs when components (1) and (2) are mixed and stored. This poor storage stability and poor compatibility leads to the problem of a non-uniform or inhomogeneous reactivity.

BRIEF SUMMARY OF THE INVENTION

The present invention takes as its object a solution to the problems described above. The present invention proposes a treatment agent in which the base (component A) and crosslinker (component B) of the treatment agent both contain the perfluoroalkyl group. Components (A) and (B) are mutually soluble to homogeneity as a consequence, and this makes possible long-term storage of the mixture of the two components. Moreover, when this treatment agent is used on fibers, textiles, plastics, metals, or porous inorganics, an excellent water repellency and oil repellency are generated because a uniform film is developed.

DETAILED DESCRIPTION OF THE INVENTION

The aforesaid object is achieved by means of a water-repellent and oil-repellent treatment agent which characteristically consists of (A) an organopolysiloxane which contains in each molecule at least 2 silicon-bonded groups selected from hydroxyl groups and alkenyl groups and at least 1 perfluoroalkyl-containing, silicon-bonded monovalent group wherein said perfluoroalkyl group has at least 6 carbon atoms,
(B) an organopolysiloxane which contains in each molecule at least 2 silicon-bonded hydrogen atoms and at least 1 perfluoroalkyl-containing, silicon-bonded monovalent group wherein said perfluoroalkyl group has at least 6 carbon atoms, and
(C) an effective amount of a curing catalyst.

To explain the preceding in greater detail, component (A) is the base material of the treatment agent under consideration, and water repellency, oil repellency, and staining resistance are imparted to the treatment substrate through this component's catalyzed reaction with the crosslinker comprising component (B). It is preferred that component (A) be a liquid at room temperature. Its molecular structure is preferably straight chain, but may in part be branched, cyclic, or network. Either block or random copolymers can be used here. Organopolysiloxane with the following general formula is preferably used as component (A).

In the preceding formula, the groups R comprise the same or different monovalent hydrocarbon groups, as exemplified by alkyl groups such as methyl, ethyl, propyl, and octyl; aralkyl groups such as 2-phenylethyl and 2-phenylpropyl; halogen-substituted alkyl groups such as 3,3,3-trifluoropropyl; cycloalkyl groups such as cyclohexyl; aryl groups such as phenyl and naphthyl; and alkaryl groups such as tolyl and xylyl. Methyl is the preferred selection. The group Q comprises the hydroxyl group or an alkenyl group such as vinyl, allyl, or hexenyl, but vinyl is the preferred selection. $R_f$ represents a monovalent group which contains perfluoroalkyl having at least 6 carbon atoms. This is the critical group not only for imparting water repellency, but in particular for imparting oil repellency and staining resistance. The following are provided as exemplary of this group $R_f$:

—CH$_2$CH$_2$CHFC$_8$F$_{17}$, —CH$_2$CH$_2$CH$_2$C$_7$F$_{15}$,
—CH$_2$CH$_2$S(CH$_2$)$_2$C$_8$F$_{17}$,
—CH$_2$CH$_2$(CF$_2$)$_7$CF(CF$_3$)$_2$, —CH$_2$CH$_2$COO(CH$_2$)C$_9$F$_{19}$, —CH$_2$CHFCOOCH$_2$CH$_2$C$_7$F$_{15}$,
—CH$_2$CH$_2$COOCH$_2$CFH(CF$_2$)$_4$CF(CF$_3$)$_2$,
—(CH$_2$)$_3$NH(CH$_2$)$_2$NH(CH$_2$)$_3$C$_7$F$_{15}$,
—CH$_2$CH$_2$COO(CH$_2$)$_2$N(C$_3$H$_7$)SO$_2$C$_{11}$F$_{23}$.

As these examples make clear, the group R$_f$ is a monovalent group which should contain a C$_d$F$_{2d+1}$ perfluoroalkyl group (d is an integer with a value of at least 6), but which is not otherwise particularly restricted in its scope. Among the C$_d$F$_{2d+1}$ perfluoroalkyl groups, those in which d (number of carbons) is 6 to 20 are preferred in order to impart a particularly good water repellency, oil repellency, and staining resistance.

In addition to the requirement that the organopolysiloxane comprising component (A) contain at least 1 silicon-bonded R$_f$ group in each molecule, this organopolysiloxane must also contain at least two silicon-bonded alkenyl groups or hydroxyl groups. The group A may be an alkenyl or hydroxyl group, although it may be a group R or R$_f$ when n is at least 2. In addition, k may be zero when n is at least 2 and A is a group R$_f$. Furthermore, n may be zero when A is an alkenyl or hydroxyl group. The simultaneous presence of the alkenyl and hydroxyl group is permissible. The value of k should be zero to 100, the value of m should be zero to 1,000, and the value of n should be zero to 100 with the proviso that k+m+n equals 5 to 2,000 and preferably falls into the range of 30 to 1,500. Moreover, since a satisfactory water repellency, oil repellency, and staining resistance are not obtained when too few groups R$_f$ are present, k/(k+m+n) should fall within the range of 0.05 to 0.98 and preferably falls within the range of 0.1 to 0.9.

Component (B) is the crosslinker for the treatment agent under consideration, and water repellency, oil repellency, and staining resistance are imparted to the treatment substrate through this component's reaction with component (A) in the presence of a catalyst. It is preferred that component (B) be a liquid at room temperature. Its molecular structure is preferably straight chain, but may in part be branched, cyclic, or network. Either block or random copolymers can be used here. Organopolysiloxane with the following general formula is preferably used as component (B).

BR$_2$SiO(RR$_f$SiO)$_k$(R$_2$SiO)$_m$(RQSiO)$_n$SiR$_2$B

The R, R$_f$, k, m, and n in this formula are exemplified as for component (A). The associated stipulations are also the same, and for this reason are omitted. B is selected from the groups R and R$_f$ and the hydrogen atom, and when B is the hydrogen atom n may be zero or an integer with a value of at least 1. The value of k may be zero when B is the group R$_f$. No particular restrictions are placed on the organopolysiloxane comprising component (B) other than that each molecule should contain at least 1 silicon-bonded R$_f$ group and at least 2 silicon-bonded hydrogen atoms. Component (B) will typically be added within the range of 1 to 50 weight parts per 100 weight parts component (A), but is not limited to this.

The curing catalyst comprising component (C) promotes or accelerates the crosslinking reaction between component (A) and component (B), and condensation-reaction catalysts and addition-reaction catalysts may be deployed here. The condensation-reaction catalysts are exemplified by the titanate esters and by the organic carboxylic acid salts of tin, lead, zirconium, zinc, iron, manganese, and so forth. Platinum-type compounds serve as the addition-reaction catalysts.

The condensation-reaction catalysts are concretely exemplified by dibutyltin diacetate, dibutyltin dilaurate, dioctyltin dilaurate, dibutyltin dioctate, tin octylate, tin dioctylate, mercaptoacetate diisooctylate, zinc octylate, zirconium naphthenate, manganese naphthenate, iron naphthenate, and tetrabutyl orthotitanate. This catalyst will generally be used within the range of 1 to 10 weight parts per 100 weight parts component (A).

The addition-reaction catalysts are concretely exemplified by chloroplatinic acid, alcohol-modified chloroplatinic acid, platinum/olefin complexes, platinum/vinylsiloxane complexes, microparticulate platinum adsorbed on a carrier such as alumina or silica, palladium catalysts, and rhodium catalysts. Platinum compounds are preferred. The platinum-type compound should be used in sufficient quantity to induce curing of the composition under consideration. Considering the economics and the generation of a well-cured film, the preferred range is 1 to 1,000 ppm as the weight of platinum referred to component (A).

The present invention further relates to a method of treating a material to impart water-repellency and oil-repellency to said material, which comprises (i) mixing a composition which consists essentially of (A) an organopolysiloxane which contains in each molecule at least 2 silicon-bonded groups selected from hydroxyl groups and alkenyl groups, wherein said alkenyl groups have 2 to 6 carbon atoms, and at least 1 silicon-bonded, perfluoroalkyl-containing, monovalent group wherein said perfluoralkyl group has 6 to 20 carbon atoms; (B) an organopolysiloxane which contains in each molecule at least 2 silicon-bonded hydrogen atoms and at least 1 silicon-bonded, perfluoroalkyl-containing monovalent group wherein said perfluoralkyl group has 6 to 20 carbon atoms; and (C) an effective amount of a curing catalyst; (ii) applying said composition to said material; (iii) curing said composition; and (iv) recovering the water-repellent and oil-repellent material.

The treatment agent according to the present invention may be used simply in the form of the mixture of components (A) through (C), but as necessary or desired it may be diluted with solvent for use or may be used in emulsion form. The solvents used for this can be those solvents, either alone or in mixture, which are generally used with ordinary organopolysiloxanes such as acetone, methyl ethyl ketone, methyl isopropyl ketone, cyclohexanone, acetylacetone, tetrahydrofuran, dioxane, ethyl acetate, ethyl propionate, dimethylformamide, dimethylacetamide; otherwise, suitable quantities of toluene, xylene, isopropyl alcohol, and hexane.

No specific restriction is placed on the surfactant used for emulsion preparation, but the most suitable within the present context are nonionic surfactants which do not inhibit catalytic function in the addition reaction. Preferred here are higher alcohol/polyoxyalkylene adducts, higher fatty acid/polyoxyalkylene adducts, alkylphenol/polyoxyalkylene adducts, and fatty acid ester/polyoxyalkylene adducts.

As necessary or desired, the treatment agent according to the present invention may also contain silane coupling agents, paint resins, fillers, thickeners, pigments, rust preventives, antimicrobials, and organopolysiloxanes other than the components used by the present invention.

The treatment agent according to the present invention can be applied to fibers, textiles, plastics, metals, porous inorganics, etc., by painting, spraying, or immersion. It is then preferably rapidly cured by the application of heat, whereupon it affords a uniform cured film which evidences an excellent water repellency, oil repellency, and staining resistance.

The present invention is explained in greater detail through the following illustrative examples. Unless specified otherwise, in the examples parts=weight parts, %=weight %, and the viscosity is the value at 25 degrees Centigrade. Me denotes the methyl radical. Vi denotes the vinyl radical.

EXAMPLE 1

The example and comparison testing were executed using the following components.

Component (A)

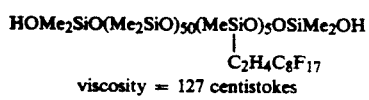

A-1 viscosity = 127 centistokes

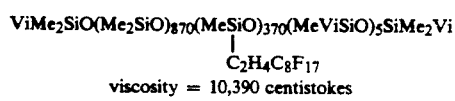

A-2 viscosity = 10,390 centistokes

Component (B)

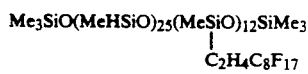

B-1 viscosity = 78 centistokes

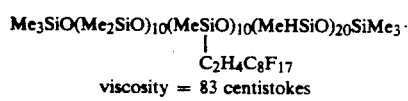

B-2 viscosity = 83 centistokes

Component (C)

C-1: dibutyltin diacetate
C-2: $H_2PtCl_6 \cdot 6H_2O$

Additional Components (D)

D-1 $Me_3SiO(MeHSiO)_{45}SiMe_3$ viscosity=23 centistokes
D-2 $HO(Me_2SiO)_{60}H$ viscosity=75 centistokes Treatment baths were prepared by mixing the above-described components (A), (B), (C), and (D) in the proportions reported in Table 1. Men's doeskin coat fabric (100% polyester finished yarn, cut into 40 by 40 cm pieces) was immersed for 10 seconds in the particular bath and then wrung out to an expression ratio of 100% using a mangle roll to give an organopolysiloxane add-on of 0.9%. The solvent was then removed by drying at room temperature. This was followed by thermal curing by suspension for 3 minutes in a hot-air circulation oven at 150 degrees Centigrade (treatment of 2 sheets). The fabric thus treated was then evaluated as follows.

(1) Water Repellency

The degree of water repellency was determined based on the spray method in JIS L-1092 (Water Resistance Test Methods for Textile Products).

(2) Oil Repellency

The fabric, cut to 10 by 10 cm, was spread out on flat filter paper, and, using a syringe, a drop each of liquid paraffin and salad oil was dripped onto it. The time (in seconds) was measured until the oil droplet spread out and was absorbed.

(3) Staining Resistance

1% carbon black powder was added to liquid paraffin and a staining fluid was prepared by dispersion to homogeneity using a mortar. It was suctioned into a syringe and dripped onto the fabric laid out flat. After 10 minutes, the fabric was pressed with gauze to absorb the residual staining fluid. Based on the degree of staining of the treated fabric, the staining resistance was evaluated on the following five-level scale.

Grade 5: absolutely no residual staining on treated fabric
Grade 4: dim staining remains on treated fabric
Grade 3: moderate staining remains on treated fabric
Grade 2: substantial staining remains on treated fabric
Grade 1: the staining fluid is mostly absorbed into the treated fabric

(4) Softness

This was evaluated on the following 3-level scale by means of organoleptic testing by manual manipulation of the treated fabric.

++: very soft, drape also excellent
+: softness and drape somewhat impaired
X: softness and drape moderately poor

(5) Compatibility

Using the particular components reported in Table 1 (excluding the catalyst and solvent), a total quantity of 100 g in the proportions reported in Table 1 was placed in a 100 mL bottle. After stirring for 5 minutes and then standing for 1 twenty-four period, the compatibility was evaluated on the following 3-level scale.

++: dispersion by dissolution to homogeneity, transparent
+: some turbidity
X: complete separation into 2 layers

(6) Global Evaluation

A global evaluation as a textile treatment agent was rendered using the following three-level scale.

++: superior rating as a textile treatment agent for imparting water repellency and oil repellency
+: somewhat unsatisfactory as a textile treatment agent for imparting water repellency and oil repellency
X: unsatisfactory as a textile treatment agent for imparting water repellency and oil repellency

TABLE 1

| | Invention Example | | | | Comparison Example | | | |
|---|---|---|---|---|---|---|---|---|
| | 1 | 2 | 3 | 4 | 1 | 2 | 3 | 4 |
| Components, parts | | | | | | | | |
| A-1 | 90 | 95 | 90 | — | 80 | — | — | — |

TABLE 1-continued

| | Invention Example | | | | Comparison Example | | | |
|---|---|---|---|---|---|---|---|---|
| | 1 | 2 | 3 | 4 | 1 | 2 | 3 | 4 |
| A-2 | — | — | — | 90 | — | — | — | — |
| B-1 | 10 | 5 | — | 10 | — | — | 100 | — |
| B-2 | — | — | 10 | — | — | — | — | — |
| C-1 | 5 | 5 | 5 | — | 5 | 5 | — | — |
| C-2 | — | — | — | 50 ppm | — | — | — | — |
| D-1 | — | — | — | — | 20 | 20 | — | — |
| D-2 | — | — | — | — | — | 80 | — | — |
| $CH_3CCl_3$ | 5500 | 5500 | 5500 | 5500 | 5500 | 5500 | 5500 | — |
| $CH_3COCH_2CH_3$ | 5500 | 5500 | 5500 | 5500 | 5500 | 5500 | 5500 | — |
| Evaluation | | | | | | | | |
| Degree of water repellency | 100 | 100 | 100 | 100 | 50–70 | 100 | 90 | 0 |
| Oil repellency, sec. | | | | | | | | |
| liquid paraffin | $10^3$ | $10^3$ | $10^3$ | $10^3$ | 35 | 0 | 930 | 0 |
| salad oil | $10^3$ | $10^3$ | $10^3$ | $10^3$ | 542 | 0 | 950 | 0 |
| Staining resistance | 5 | 5 | 5 | 5 | 3 | 1–2 | 5 | 1 |
| Softness | ++ | ++ | ++ | ++ | ++ | ++ | + | + |
| Compatibility | ++ | ++ | ++ | ++ | × | ++ | — | — |
| Global evaluation | ++ | ++ | ++ | ++ | + | + | +-× | × |

EXAMPLE 2

The following were dissolved in 990 parts 1,1,1-trichloroethane: 2 parts of the component B-1 used as crosslinker in Example 1 and, as the component (A), 8 parts organopolysiloxane (A-3) with the following structure.

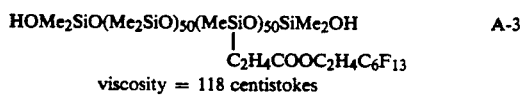

$$\text{HOMe}_2\text{SiO}(\text{Me}_2\text{SiO})_{50}(\text{MeSiO})_{50}\text{SiMe}_2\text{OH} \quad \text{A-3}$$
$$| $$
$$\text{C}_2\text{H}_4\text{COOC}_2\text{H}_4\text{C}_6\text{F}_{13}$$

viscosity = 118 centistokes

A treatment bath was finally prepared by the addition of 0.3 parts dibutyltin dilaurate as catalyst.

Into this was immersed table cloth fabric made of 100% cotton. It was removed, wrung out on a mangle roll to an expression ratio of 100%, dried by hanging at room temperature, then cured by heating for 4 minutes in a hot-air circulation oven at 140 degrees Centigrade. Using a syringe, the following were dripped onto the treated table cloth and, for comparison, untreated table cloth (in each case laid out flat): ASTM No. 1 mineral oil, soybean oil, Worcester sauce, soy sauce, mayonnaise, salad dressing, and sake. In each case the added material was absorbed off with gauze after 3 minutes and the staining was then visually evaluated.

As reported in Table 2, in no case did a strain remain on table cloth treated with the treatment agent under consideration, and the staining resistance was thus excellent.

TABLE 2

| Added Material | Treated table cloth | Untreated table cloth |
|---|---|---|
| ASTM No. 1 mineral oil | no staining | substantial staining |
| soybean oil | no staining | substantial staining |
| Worcester sauce | no staining | substantial staining |
| soy sauce | no staining | substantial staining |
| mayonnaise | no staining | substantial staining |
| salad dressing | no staining | substantial staining |
| sake | no staining | substantial staining |

EXAMPLE 3

The following were mixed to homogeneity: 180 parts of the organopolysiloxane (A-3) as used in Example 2, 20 parts of the component B-1 used in Example 1 as crosslinker, and 100 parts acetone. Then, 33 parts of the nonionic surfactant polyoxyethylene nonylphenol ether (6 mole EO adduct), 17 parts of the nonionic surfactant polyoxyethylene nonylphenol ether (12 mole EO adduct), and 650 parts water were added with mixing to homogeneity, and an emulsion was then prepared using an emulsifier. In order to prepare the treatment bath, 380 parts water and 1 part emulsion catalyst containing 40% dibutyltin dilaurate were added to 20 parts of this emulsion.

Raincoat fabric (65% polyester/35% cotton) was immersed in this treatment bath and was then wrung out using a mangle roll to an expression ratio of 100%, dried in a hot-air circulation oven for 5 minutes at 105 degree Centigrade, and subsequently cured by heating for 5 minutes at 150 degrees Centigrade in the same device. Three sheets of treated fabric were prepared by this method. Among these 3 sheets of treated fabric, 1 sheet was subjected to a 2-cycle wash in which 1 cycle consisted of a 15 minute wash using a 0.3% aqueous solution of a synthetic detergent (Zabu from Kao Kabushiki Kaisha) followed by a water rinse for 10 minutes.

In addition, another sheet of the treated fabric was dry cleaned by stirring for 15 minutes in mineral spirits (mineral oil-based dry-cleaning agent) at a bath ratio of 1:50. The treated fabrics were then evaluated as in Example 1. As the results in Table 3 make clear, the water repellency, oil repellency, and staining resistance remained unchanged even after laundering with detergent or dry cleaning, and the treatment agent under consideration thus proved capable of imparting a durable water repellency and oil repellency to textiles.

TABLE 3

| Type of Cleaning | Test Item | Results |
|---|---|---|
| None | Water repellency | 100 |
| | Oil repellency (salad oil) | 1000 |
| | Staining resistance (grade) | 5 |
| Laundered with detergent | Water repellency | 100 |
| | Oil repellency (salad oil) | 1000 |
| | Staining resistance (grade) | 5 |
| Dry cleaning | Water repellency | 100 |
| | Oil repellency (salad oil) | 1000 |
| | Staining resistance (grade) | 5 |

EXAMPLE 4

Kitchen floor brick was immersed for 1 minute in the treatment bath described in Example 2, then removed and allowed to stand overnight at room temperature.

Thermal curing was conducted by introduction for 30 minutes into a hot-air circulation oven at 150 degrees Centigrade. The treated kitchen brick (cooled by standing overnight at room temperature) and untreated kitchen brick were placed on a laboratory bench, and, operating as in Example 2, mineral oil, soybean oil, water, and Worcester sauce were dripped on the samples using a syringe. The added material was absorbed off with gauze after 10 minutes, and infiltration into the brick and the extent of staining were visually evaluated.

The results, as reported in Table 4, show that neither infiltration nor residual staining occurred in any case on kitchen floor brick treated with the treatment agent under consideration, and the water repellency, oil repellency, and staining resistance were therefore excellent.

TABLE 4

| Added Material | Treated Brick | Untreated Brick |
|---|---|---|
| ASTM No. 1 mineral oil | no infiltration no staining | complete infiltration substantial staining |
| Soybean oil | no infiltration no staining | complete infiltration substantial staining |
| Water | no infiltration no wetting | complete infiltration substantial wetting |
| Worcester sauce | no infiltration no staining | complete infiltration substantial staining |

Effects of the Invention

Both the organopolysiloxane used as the base and the organopolysiloxane used as the crosslinker in the water-repellent and oil-repellent treatment agent according to the present invention possess a perfluoroalkyl ($C_6$)-containing silicon-bonded monovalent group. As a consequence, these two components are homogeneously compatible, and the treatment agent according to the present invention is therefore characteristically capable of imparting an outstanding water repellency and oil repellency to fibers, textiles, plastics, metals, porous inorganics, and so forth.

That which is claimed is:

1. A method of treating a material to impart water-repellency and oil-repellency to said material, which comprises:
  (i) mixing a composition which consists essentially of
    (A) an organopolysiloxane which contains in each molecule at least 2 silicon-bonded groups selected from hydroxyl groups and alkenyl groups, wherein said alkenyl groups have 2 to 6 carbon atoms, and at least 1 silicon-bonded, perfluoroalkyl-containing, monovalent group wherein said perfluoroalkyl group has 6 to 20 carbon atoms;
    (B) an organopolysiloxane which contains in each molecule at least 2 silicon-bonded hydrogen atoms and at least 1 silicon-bonded, perfluoroalkyl-containing monovalent group wherein said perfluoroalkyl group has 6 to 20 carbon atoms; and
    (C) an effective amount of a curing catalyst;
  (ii) applying said composition to said material;
  (iii) curing said composition; and
  (iv) recovering the water-repellent and oil-repellent material.

2. A method in accordance with claim 1 wherein component (A) has the formula

and component (B) has the formula

wherein, at each occurrence, R is a monovalent hydrocarbon or halogenated hydrocarbon group having 1 to 9 carbon atoms, Q is the hydroxyl group or an alkenyl group, $R_f$ represents a monovalent group which contains a perfluoroalkyl group having at least 6 to 20 carbon atoms; A is an alkenyl group having at 2 to 6 carbon atoms, an hydroxyl group, an R group or and $R_f$ group, B is an R group, an $R_f$ group or the hydrogen atom, and the values of the subscripts k, m and n are zero or more, with the proviso that (A) contains at least one silicon-bonded $R_f$ group and at least two silicon-bonded hydroxyl or alkenyl groups and (B) contains at least 1 silicon-bonded $R_f$ group and at least 2 silicon-bonded hydrogen atoms.

3. A method in accordance with claim 2 wherein component (B) is used in an amount of from 1 to 50 parts by weight for every 100 parts by weight of component (A).

4. A method in accordance with claim 3 wherein the value of k is from zero to 100, the value of m is from zero to 1,000, the value of n is from zero to 100; with the provisos that the value of k+m+n equals 5 to 2,000 and the value of k/(k+m+n) falls within the range of 0.05 to 0.98.

5. A method in accordance with claim 3 wherein the component (A) contains at least two vinyl groups and the curing catalyst is an addition-reaction catalyst.

6. A method in accordance with claim 3 wherein the A groups of component (A) are hydroxyl and the curing catalyst is a condensation-reaction catalyst.

7. A method in accordance with claim 1 further comprising a dilution solvent.

8. A method in accordance with claim 1 wherein said material is a textile.

* * * * *